United States Patent [19]

Engelhardt et al.

[11] 4,401,836

[45] Aug. 30, 1983

[54] MODIFIED POLYVINYL ALCOHOL AND ITS USE AS A SIZING AGENT

[75] Inventors: Friedrich Engelhardt, Frankfurt am Main; Rolf Kleber, Neu-Isenburg, both of Fed. Rep. of Germany

[73] Assignee: Hoechst Aktiengesellschaft, Fed. Rep. of Germany

[21] Appl. No.: 355,626

[22] Filed: Mar. 8, 1982

[30] Foreign Application Priority Data

Mar. 14, 1981 [DE] Fed. Rep. of Germany ....... 3109844

[51] Int. Cl.³ .............................................. C08F 8/34
[52] U.S. Cl. ...................................... 525/61; 8/115.6; 8/115.7; 427/389.9
[58] Field of Search ................ 525/61; 8/115.6, 115.7; 427/389.9

[56] References Cited

U.S. PATENT DOCUMENTS 2,434,145 1/1948 Coffman ................................. 525/60
4,013,805 3/1977 Corey et al. ......................... 524/428

FOREIGN PATENT DOCUMENTS 729774 7/1942 Fed. Rep. of Germany.

Primary Examiner—Stanford M. Levin
Attorney, Agent, or Firm—Connolly and Hutz

[57] ABSTRACT

Polyvinyl alcohol modified by reaction with formaldehyde and amidosulfonic acid at a pH value of 4 to 7, which value is established by the addition of an organic amine. This modified polyvinyl alcohol is suitable for use as a sizing agent for yarns.

4 Claims, No Drawings

MODIFIED POLYVINYL ALCOHOL AND ITS USE AS A SIZING AGENT

The use of polyvinyl alcohol for sizing yarns is well known (C.A. Finch "Polyvinyl alcohol—properties and applications", London 1973, page 233 et seq.). As mentioned there, fully hydrolyzed polyvinyl alcohol types, ie polyvinyl acetates which have been hydrolyzed down to a very small residual acetyl content, are used for sizing hydrophilic yarns, such as, for example, cotton, linen or viscose. Partially hydrolyzed types are used for sizing yarns made from polyamide, polyester and polyacrylic fibers. Although polyvinyl alcohol has satisfactory sizing effects, ie good running properties on weaving, there is the problem that on desizing, over-dried warps can be washed out only with difficulty. That the solubility in water is too low is also demonstrated in an alkaline treatment of fabrics which have been sized with polyvinyl alcohol. In this treatment the alkali increases the crystallinity to a considerable extent and produces a product which is only sparingly soluble in water, so that fabrics sized with polyvinyl alcohol must, in practice, first be desized with hot water before any alkaline processing.

As regards sizing and desizing, there is therefore the object of developing sizing agents which have the acknowledged positive properties of polyvinyl alcohol but which at the same time are readily soluble even in a strongly alkaline medium.

Alkali-soluble polyvinyl alcohols have already been described in U.S. Pat. No. 4,013,805. Here the solubility is achieved by copolymerization with alkali-soluble comonomers, for example acrylic acid, maleic acid or fumaric acid. However, the preparation of these products requires copolymerization of vinyl acetate and acrylic acid, which is expensive compared to the homopolymerization of vinyl acetate alone.

The preparation of an alkali-soluble polyvinyl alcohol is simpler if this polyvinyl alcohol is chemically modified. German Pat. No. 729,774 thus describes a modification of polyvinyl alcohol by reacting it with glyoxylic acid or benzaldehydecarboxylic acids. However, this type of modification is very time-consuming. Furthermore, the reagents used are relatively inaccessible. Further derivatives of polyvinyl alcohol which are said to be alkali-soluble are described in U.S. Pat. No. 2,434,145. They are obtained by reaction with chloroacetic acid. However, reworking this literature method produced only completely insoluble products.

It has now been found that polyvinyl alcohol derivatives which are readily soluble in alkali are obtained when polyvinyl alcohol is modified with formaldehyde and amidosulfonic acid.

The invention thus relates to modified polyvinyl alcohol which is prepared by reacting polyvinyl alcohol with formaldehyde and amidosulfonic acid at a pH value of 4 to 7, which value is established by the addition of an organic amine.

Any partially or fully hydrolyzed polyvinyl alcohol type serves as a starting product for the reaction. The viscosities in a 4% strength aqueous solution at 20° C. are between 4 and 40 mPas for the partially hydrolyzed types and between 4 and 66 mPas for the fully hydrolyzed types. The degree of hydrolysis is between 80 and 99.7 mol%. To prepare readily soluble products this polyvinyl alcohol is reacted with 5 to 25% by weight of a mixture of formaldehyde and amidosulfonic acid, relative to the weight of polyvinyl alcohol. The molar ratio of formaldehyde to amidosulfonic acid is between 0.3:1 and 1:0.3.

The reaction is carried out in aqueous solution at a concentration of all three components of between about 10 and 50% by weight. Preferably, formaldehyde is initially introduced in the form of a commercially available formalin solution and polyvinyl alcohol and amidosulfonic acid are dissolved therein. This mixture is then heated for about 30 minutes to 3 hours at elevated temperatures, advantageously at about 80° to 100° C. It is particularly important here that a pH value of 4 to 7, in particular of 5.5 to 6.5, is established by the addition of a liquid organic amine. This amine is added either after the reaction is complete or, preferably, during the reaction. The amines used are advantageously compounds of the formula

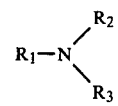

in which $R_1$ denotes $C_1$–$C_4$-alkyl, $C_3$–$C_4$-hydroxyalkyl, benzyl, phenyl or cyclohexyl, $R_2$ has the same meaning as $R_1$ and additionally denotes hydrogen, and $R_3$ denotes hydrogen, $C_1$–$C_4$-alkyl or $C_3$–$C_4$-hydroxyalkyl, or $R_2$ and $R_3$ denote, together with the nitrogen atom, a morpholine ring. Examples of such amines are mono-, di- or triethanolamine, benzylamine, dibenzylamine, β-hydroxyethylmorpholine, triethylamine, triisopropanolamine, di-β-hydroxyethylmonomethylamine, dicyclohexylamine, methylaniline, ethylaniline, aniline, diphenylamine, diethylamine and dibutylamine.

After the reaction is complete water is removed by distillation, and a modified polyvinyl alcohol is obtained as a powder or in the form of granules. However, the removal of water can also be dispensed with and the aqueous solution obtained can be used direct for sizing.

Modified polyvinyl alcohols thus obtained have the known advantageous properties of customary, unmodified polyvinyl alcohols, such as low dependence on atmospheric conditions during weaving, high adhesiveness, and low sensitivity to water on the sized yarns. It is surprising that in addition to these properties these modified polyvinyl alcohols are readily soluble in an alkaline medium. While films prepared from partially or fully hydrolyzed polyvinyl alcohol do not dissolve at all in aqueous liquors containing between 10 and 300 g/l of sodium hydroxide or potassium hydroxide, films of the modified polyvinyl alcohol described above dissolve very readily not only in water but also in the alkaline liquors described at temperatures between 0° and 100° C.

Sizing with the polyvinyl alcohol modified according to the invention is carried out in a customary manner, and additives, such as sizing grease, softeners, and other sizing agents, specifically starches and modified starch derivatives, can be additionally added to the sizing bath. The modified polyvinyl alcohol is suitable for sizing synthetic yarns, thus, for example, for filaments and staple fibers of polyamide, polyester and polyacrylonitrile. However, the modified polyvinyl alcohol is particularly suitable for sizing yarns of pure cotton or of cotton-polyester blends. The concentration of the modified polyvinyl alcohol in the sizing liquor is in all cases about 6 to 8% by weight, and the add-on of sizing agent to the yarn is about 8 to 14% by weight.

EXAMPLE 1

100 g of polyvinyl alcohol (degree of hydrolysis 88%, viscosity 4 mPas as measured on a 4% strength aqueous solution at 20° C.) were dissolved at 80° C. with stirring in 300 g of water together with 5 g of $NH_2SO_3H$ and 5 g of a 37% strength formalin solution. The mixture was heated to 90°–95° C., and after 1 hour 10 g of triethanolamine were added at this temperature, whereupon a pH value of 6 became established. After the reaction was complete, water was removed from the highly viscous solution on a thin-film evaporator, and granules were obtained.

EXAMPLE 2

In the same way as described in Example 1, 100 g of polyvinyl alcohol (degree of hydrolysis 98%; viscosity 56 mPas as measured on a 4% strength solution) were reacted with 10 g of $NH_2SO_3H$, 10 g of a 37% strength formalin solution and 20 g of diethylaminoethanol in 400 g of water. After the reaction was completed the pH value of the highly viscous solution was 6.5. The solids content was adjusted to 40% by the addition of water.

The following products were reacted in the same way as described in Example 1:

EXAMPLE 3

100 g of polyvinyl alcohol (degree of hydrolysis 88%; viscosity 18 mPas)
15 g of $NH_2SO_3H$
15 g of formalin (37% strength aqueous solution) pH value adjusted to 6–6.5 by means of β-hydroxyethylmorpholine.

EXAMPLE 4

100 g of polyvinyl alcohol (degree of hydrolysis 88%; viscosity 40 mPas)
5 g of $NH_2SO_3H$
7 g of formalin (37% strength aqueous solution) pH value adjusted to 6–6.5 by means of diethanolamine.

EXAMPLE 5

100 g of polyvinyl alcohol (degree of hydrolysis 100%; viscosity 66 mPas)
25 g of formalin (37% strength aqueous solution) pH value adjusted to 6–6.5 by means of ethanolamine.

The products obtained in accordance with Examples 1 to 5 were dissolved in water and films were cast from the aqueous solutions. Films were prepared in the same way from the unmodified polyvinyl alcohols which serve as a starting product in Examples 1 to 5. All films readily dissolved in water at 60° C. The modified polyvinyl alcohols of Examples 1 to 5 dissolved in the course of 10–60 seconds in a 6% strength aqueous NaOH or KOH solution at 60° C. The unmodified polyvinyl alcohols were not soluble in these solutions.

The water uptake of the films at 22° C. and 85% relative humidity was 6–8% for the unmodified and 14–17% for the modified polyvinyl alcohols. For comparison the water uptake was determined for an ammonium polyacrylate, which in practice can not be used on its own since it tends to mark off. This water uptake was 35%.

A 67:33 polyester-cotton yarn, Nm 50/1, was sized with a sizing liquor at 85° C. The liquors contained 8% of the sizing agents indicated below and 0.2% of a softener (a fatty acid condensation product), and the add-on of sizing agent to the yarn was about 12%. The following products were used as sizing agents:

(a) unmodified polyvinyl alcohol from Example 1
(b) unmodified polyvinyl alcohol from Example 2
(c) modified polyvinyl alcohol in accordance with Example 1
(d) modified polyvinyl alcohol in accordance with Example 2
(e) modified polyvinyl alcohol in accordance with Example 3

The weaving properties of the yarns sized with the products (a)–(e) were termed similar. However, after a desizing with an alkaline liquor only the yarns sized with products (c)–(e) are free of sizing agent residues.

We claim:

1. A modified polyvinyl alcohol, obtained by reacting polyvinyl alcohol with formaldehyde and amidosulfonic acid in aqueous solution at a concentration of all three components of between 10 and 50% by weight and at a pH value of 4 to 7, which value is established by the addition of an organic amine.

2. A modified polyvinyl alcohol as claimed in claim 1, obtained by reaction with 5 to 25% by weight of a mixture of amidosulfonic acid and formaldehyde, relative to the weight of polyvinyl alcohol, the molar ratio of formaldehyde to amidosulfonic acid being 0.3:1 to 1:0.3.

3. A method for treating yarn comprising the step of treating the yarn with a sizing agent, wherein the sizing agent is a modified polyvinyl alcohol of claim 1.

4. A method for treating yarn comprising the step of treating the yarn with a sizing agent, wherein the sizing agent is a modified polyvinyl alcohol of claim 2.

* * * * *